US012217896B2

(12) United States Patent
Yoon et al.

(10) Patent No.: US 12,217,896 B2
(45) Date of Patent: Feb. 4, 2025

(54) COIL COMPONENT

(71) Applicant: SAMSUNG ELECTRO-MECHANICS CO., LTD., Suwon-si (KR)

(72) Inventors: Chan Yoon, Suwon-si (KR); Dong Hwan Lee, Suwon-si (KR); Dong Jin Lee, Suwon-si (KR); Sang Soo Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 577 days.

(21) Appl. No.: 17/116,091

(22) Filed: Dec. 9, 2020

(65) Prior Publication Data

US 2022/0020523 A1 Jan. 20, 2022

(30) Foreign Application Priority Data

Jul. 15, 2020 (KR) ........................ 10-2020-0087633

(51) Int. Cl.
*H01F 27/29* (2006.01)
*H01F 27/255* (2006.01)
(Continued)

(52) U.S. Cl.
CPC ....... *H01F 27/2804* (2013.01); *H01F 27/255* (2013.01); *H01F 27/29* (2013.01);
(Continued)

(58) Field of Classification Search
CPC .... H01F 27/29; H01F 17/04; H01F 2017/048; H01F 27/292; H01F 17/0006;
(Continued)

(56) References Cited

U.S. PATENT DOCUMENTS 5,071,509 A * 12/1991 Kano .................... H01F 41/042 216/49
6,194,248 B1 * 2/2001 Amaya .................... H01G 4/06 336/200
(Continued)

FOREIGN PATENT DOCUMENTS

CN 105448503 A * 3/2016 ......... H01F 17/0006
JP 2015126199 A * 7/2015
(Continued)

OTHER PUBLICATIONS

Office Action dated Nov. 29, 2024, issued in corresponding Korean Patent Application No. 10-2020-0087633 with an English translation.

*Primary Examiner* — Mang Tin Bik Lian
(74) *Attorney, Agent, or Firm* — Morgan, Lewis & Bockius LLP

(57) ABSTRACT

A coil component includes a body, a planar spiral-shaped coil portion disposed in the body, a lead portion disposed to be spaced apart from the coil portion in the body, a support substrate disposed between the coil portion and the lead portion to correspond to the lead portion, a via penetrating through the support substrate to connect an internal end portion of the coil portion and an internal end portion of the lead portion to each other, an insulating layer covering the coil portion and the lead portion, and a first external electrode and a second external electrode disposed to be spaced apart from each other on a surface of the body and connected to the external end portion of each of the coil portion and the lead portion.

19 Claims, 4 Drawing Sheets

(51) Int. Cl.

| | |
|---|---|
| ***H01F 27/28*** | (2006.01) |
| ***H01F 27/32*** | (2006.01) |
| ***H01F 41/04*** | (2006.01) |
| ***H01F 41/12*** | (2006.01) |

(52) U.S. Cl.

CPC .......... *H01F 27/32* (2013.01); *H01F 41/041* (2013.01); *H01F 41/12* (2013.01)

(58) Field of Classification Search

CPC ............. H01F 27/2804; H01F 27/2823; H01F 27/2828; H01F 27/323; H01F 27/327; H01F 17/0013; H01F 2017/002; H01F 2017/0046; H01F 2017/0066; H01F 2017/0073; H01F 2027/2809; H01F 27/255; H01F 27/32; H01F 27/324; H01F 41/041; H01F 41/12; H01F 5/04; H01F 27/2852; H01F 27/28

See application file for complete search history.

(56) References Cited

U.S. PATENT DOCUMENTS

| | | | | |
|---|---|---|---|---|
| 11,282,630 | B2 | 3/2022 | Yamaguchi et al. | |
| 2009/0154052 | A1* | 6/2009 | Yoneda | H01T 4/12 361/220 |
| 2010/0157565 | A1* | 6/2010 | Yoshida | H01G 4/33 361/811 |
| 2013/0314189 | A1* | 11/2013 | Okumura | H01F 17/0013 336/192 |
| 2014/0292462 | A1* | 10/2014 | Lee | H01F 27/29 29/602.1 |
| 2015/0035640 | A1* | 2/2015 | Wang | H01F 41/042 336/200 |
| 2015/0340149 | A1* | 11/2015 | Lee | H05K 1/111 336/200 |
| 2016/0078986 | A1* | 3/2016 | Yoon | H01F 5/04 336/83 |
| 2016/0163444 | A1* | 6/2016 | Choi | H01F 41/043 336/200 |
| 2016/0336105 | A1 | 11/2016 | Choi et al. | |
| 2016/0343500 | A1* | 11/2016 | Jung | H01F 41/042 |
| 2017/0194084 | A1* | 7/2017 | Choi | H01F 27/022 |
| 2018/0075965 | A1* | 3/2018 | Yoshioka | H01F 27/2823 |
| 2018/0197672 | A1 | 7/2018 | Kim et al. | |
| 2019/0013141 | A1* | 1/2019 | Yoon | H01F 27/292 |
| 2019/0088407 | A1* | 3/2019 | Jung | H01F 17/0013 |
| 2019/0164676 | A1* | 5/2019 | Tsuduki | H01F 17/0033 |
| 2019/0180928 | A1* | 6/2019 | Lee | H01F 27/24 |
| 2019/0326047 | A1* | 10/2019 | Yamaguchi | H01F 27/292 |
| 2019/0392982 | A1* | 12/2019 | Lin | H01F 27/325 |
| 2020/0090858 | A1* | 3/2020 | Hong | H01F 27/323 |
| 2020/0105456 | A1 | 4/2020 | Kim et al. | |
| 2020/0168375 | A1* | 5/2020 | Park | H01F 27/2804 |
| 2020/0219644 | A1* | 7/2020 | Kim | H01F 27/2804 |
| 2021/0110965 | A1* | 4/2021 | Kawachi | H01F 17/04 |
| 2021/0210276 | A1* | 7/2021 | Park | H01F 27/2885 |

FOREIGN PATENT DOCUMENTS

| | | | | |
|---|---|---|---|---|
| JP | 2018-46051 | A | | 3/2018 |
| JP | 2019-192676 | A | | 10/2019 |
| KR | 10-2015-0009391 | A | | 1/2015 |
| KR | 10-2016-0132593 | A | | 11/2016 |
| KR | 10-1862503 | B1 | | 5/2018 |
| KR | 20190015738 | | * | 2/2019 |
| KR | 10-2020-0038058 | A | | 4/2020 |

* cited by examiner

COIL COMPONENT

CROSS-REFERENCE TO RELATED APPLICATION(S)

The present application claims the benefit of priority to Korean Patent Application No. 10-2020-0087633, filed on Jul. 15, 2020 in the Korean Intellectual Property Office, the entire disclosure of which is incorporated herein by reference.

TECHNICAL FIELD

The present disclosure relates to a coil component.

BACKGROUND

An inductor, a coil component, is a typical passive electronic component used in electronic devices, along with a resistor and a capacitor.

As electronic devices gradually gain higher performance and become smaller, the number of electronic components used in electronic devices has increased, while being miniaturized.

In the case of a thin-film type coil component according to the related art, a support substrate is used to support a coil portion formed by plating. In a subsequent process, a portion of the support substrate is removed, having a shape corresponding to a shape of the coil portion.

SUMMARY

An aspect of the present disclosure is to provide a coil component which may be thinned.

Another aspect of the present disclosure is to provide a coil component which may improve a ratio of a magnetic material.

According to an aspect of the present disclosure, a coil component includes a body, a planar spiral-shaped coil portion disposed in the body, a lead portion disposed to be spaced apart from the coil portion in the body, a support substrate disposed between the coil portion and the lead portion to correspond to the lead portion, a via penetrating through the support substrate to connect an internal end portion of the coil portion and an internal end portion of the lead portion to each other, an insulating layer covering the coil portion and the lead portion, and a first external electrode and a second external electrode disposed to be spaced apart from each other on a surface of the body and connected to the external end portion of each of the coil portion and the lead portion.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
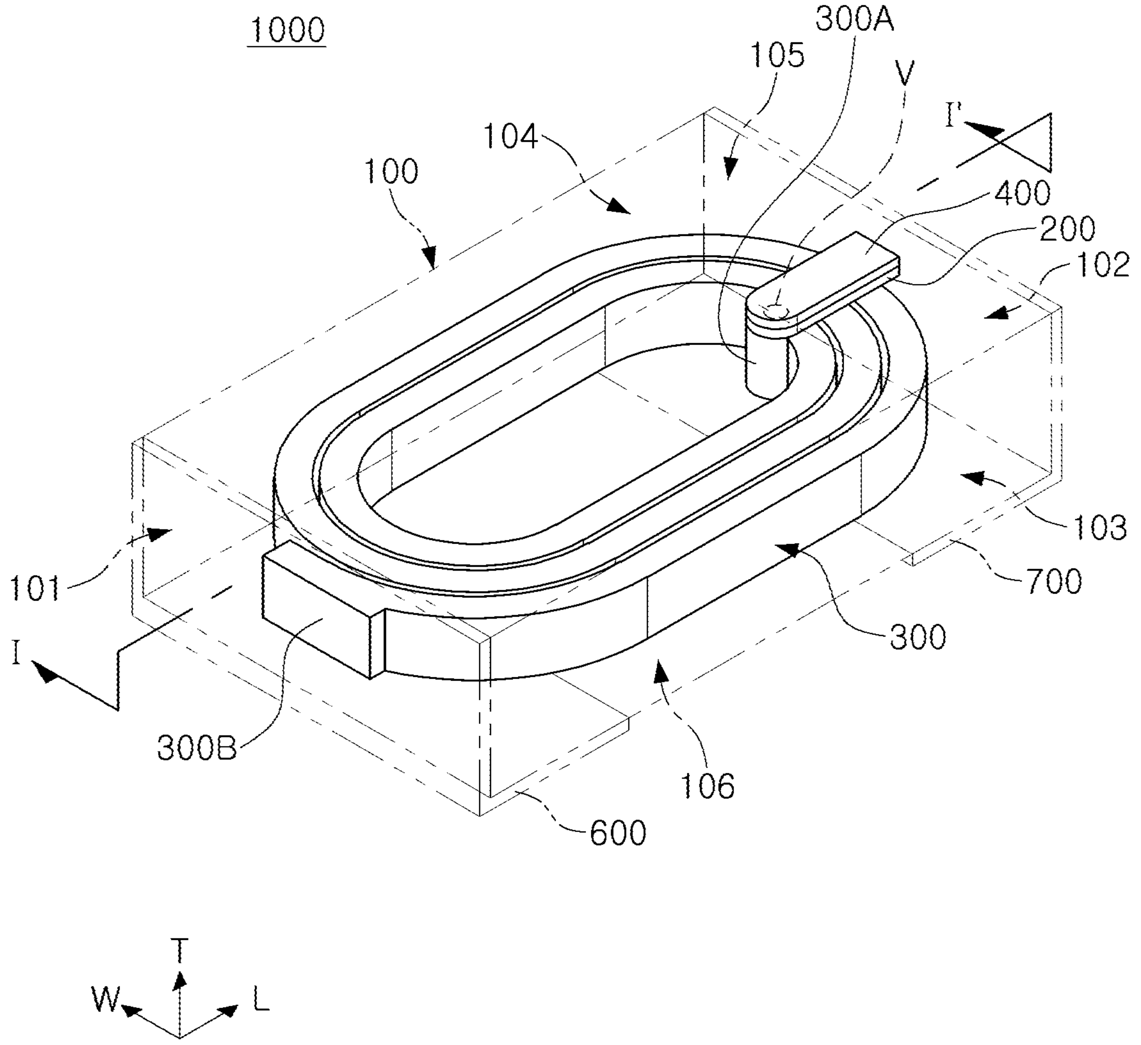
FIG. 1 is a schematic perspective view of a coil component according to a first embodiment of the present disclosure.

The terms used in the description of the present disclosure are used to describe a specific embodiment, and are not intended to limit the present disclosure. A singular term includes a plural form unless otherwise indicated. The terms “include,” “comprise,” “is configured to,” etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms “disposed on,” “positioned on,” and the like, may indicate that an element is positioned on or beneath an object, and does not necessarily mean that the element is positioned above the object with reference to a gravity direction.

The term “coupled to,” “combined to,” and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an L direction is a first direction or a length (longitudinal) direction, a W direction is a second direction or a width direction, a T direction is a third direction or a thickness direction.

Hereinafter, a coil component according to an exemplary embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

First Embodiment

Figure 2:
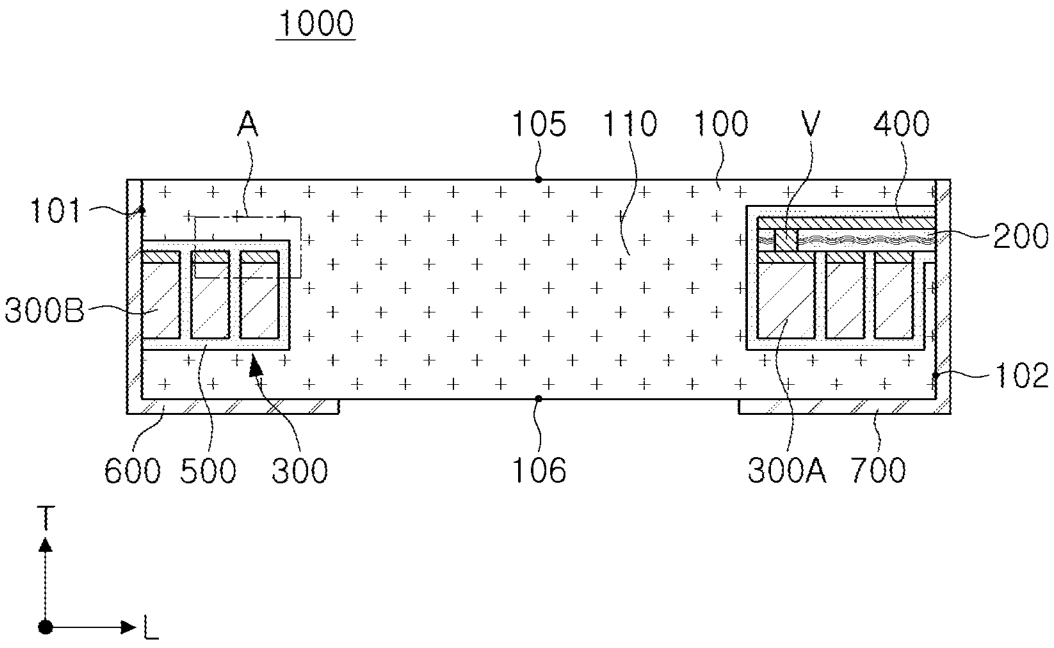
FIG. 2 is a cross-sectional view taken along line I-I' of FIG. 1.
Figure 3:
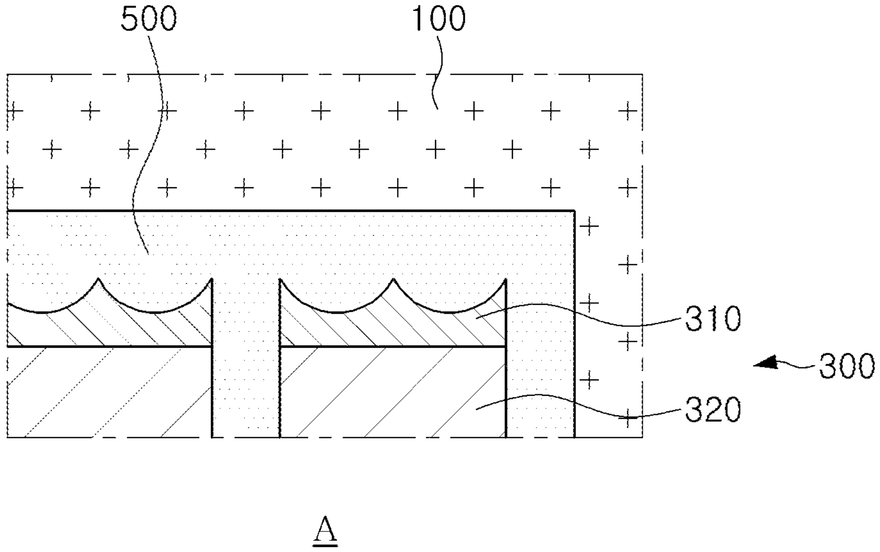
FIG. 3 is an enlarged view of section ‘A’ of FIG. 2.

FIG. 1 is a schematic perspective view of a coil component according to a first embodiment of the present disclosure. FIG. 2 is a cross-sectional view taken along line I-I' of FIG. 1. FIG. 3 is an enlarged view of portion ‘A’ of FIG. 2.

Referring to FIGS. 1 to 3, a coil component 1000 according to an exemplary embodiment may include a body 100, a support substrate 200, a coil portion 300, a lead portion 400, a via V, an insulating layer 500, and external electrodes 600 and 700.

The body 100 may form an exterior of the coil component 1000, and the coil portion 300 and the support substrate 200 may be disposed in the body 100.

The body 100 may be formed to have a hexahedral shape overall.

The body 100 has a first surface 101 and a second surface 102 opposing each other in a length direction L, a third surface 103 and a fourth surface 104 opposing each other in a width direction W, and a fifth surface 105 and a sixth surface 106 opposing each other in a thickness direction T, based on FIGS. 1 and 2. Each of the first to fourth surfaces 101, 102, 103, and 104 of the body 100 may correspond to a wall surface of the body 100 connecting the fifth surface 101 and the sixth surface 106 of the body 100. Hereinafter, both end surfaces of the body 100 may refer to the first surface 101 and the second surface 102 of the body 100, respectively, both side surfaces of the body 100 may refer to the third surface 103 and the fourth surface 104, respectively, and one surface and the other surface of the body 100 may refer to the sixth surface 106 and the fifth surface 105 of the body 100, respectively.

As an example, the body 100 may be formed in such a manner that the coil component 1000, including the external electrodes 600 and 700 to be described later, has a length of 2.5 mm, a width of 2.0 mm, and a thickness of 1.0 mm, but the present disclosure is not limited thereto. Since the above-mentioned length, width, and thickness values of a coil component 1000 exclude tolerances, actual length, width, and thickness values of the coil component may be different from the above-mentioned values due to the tolerances.

The term "length of the coil component 1000" may refer to, based on an optical microscope image for the coil component 1000 taken toward the fifth surface 105 of the body 100 on the fifth surface 105 of the body 100, a maximum value, among lengths of a plurality of segments connecting two boundary lines opposing each other in a length (L) direction of the body 100, among outermost boundary lines of the coil component 1000 illustrated in the image, and parallel to the length (L) direction. Alternatively, the term "length of the coil component 1000" may refer to, based on the image, a minimum value, among lengths of a plurality of segments connecting two boundary lines opposing each other in a length (L) direction, among outermost boundary lines of the coil component 1000 illustrated in the image, and parallel to the length (L) direction of the body 100. Alternatively, the term "length of the coil component 1000" may refer to an arithmetic mean of at least three segments, among a plurality of segments connecting two boundary lines opposing each other in a length (L) direction, among outermost boundary lines of the coil component 1000 illustrated in the image, and parallel to the length (L) direction of the body 100.

The term "width of the coil component 1000" may refer to, based on an optical microscope image for the coil component 1000 taken toward the fifth surface 105 of the body 100 on the fifth surface 105 of the body 100, a maximum value, among lengths of a plurality of segments connecting two boundary lines opposing each other in a width (L) direction of the body 100, among outermost boundary lines of the coil component 1000 illustrated in the image, and parallel to the width (W) direction. Alternatively, the term "width of the coil component 1000" may refer to, based on the image, a minimum value, among lengths of a plurality of segments connecting two boundary lines opposing each other in a width (W) direction, among outermost boundary lines of the coil component 1000 illustrated in the image, and parallel to the width (W) direction of the body 100. Alternatively, the term "width of the coil component 1000" may refer to an arithmetic mean of at least three segments, among a plurality of segments connecting two boundary lines opposing each other in a width (W) direction, among outermost boundary lines of the coil component 1000 illustrated in the image, and parallel to the width (W) direction of the body 100.

The term "thickness of the coil component 1000" may refer to, based on an optical microscope image for the coil component 1000 taken toward the first surface 101 of the body 100 on the first surface 101 of the body 100, a maximum value, among lengths of a plurality of segments connecting two boundary lines opposing each other in a thickness (T) direction of the body 100, among outermost boundary lines of the coil component 1000 illustrated in the image, and parallel to the thickness (T) direction. Alternatively, the term "thickness of the coil component 1000" may refer to, based on the image, a minimum value, among lengths of a plurality of segments connecting two boundary lines opposing each other in a width (W) direction, among outermost boundary lines of the coil component 1000 illustrated in the image, and parallel to the thickness (T) direction of the body 100. Alternatively, the term "thickness of the coil component 1000" may refer to an arithmetic mean of at least three segments, among a plurality of segments connecting two boundary lines opposing each other in a thickness (T) direction, among outermost boundary lines of the coil component 1000 illustrated in the image, and parallel to the thickness (T) direction of the body 100.

Each of the length, the width, and the thickness of the coil component 1000 may be measured by a micrometer measurement method. In the micrometer measurement method, measurement may be performed by setting a zero point using a micrometer with gage repeatability and reproducibility (R&R), inserting the coil component 1000 inserted between tips of the micrometer, and turning a measurement lever of the micrometer. When the length of the coil component 1000 is measured by a micrometer measurement method, the length of the coil component 1000 may refer to a value measured once or an arithmetic mean of values measured multiple times. This may be equivalently applied to the width and the thickness of the coil component 1000.

The body 100 may include a magnetic material and a resin. Specifically, the body 100 may be formed by laminating at least one magnetic composite sheet in which a magnetic material is dispersed in a resin. However, the body 100 may have a structure other than the structure in which a magnetic material is dispersed in a resin. For example, the body 100 may be formed of a magnetic material such as ferrite.

The magnetic material may be ferrite or magnetic metal powder particles.

Examples of the ferrite powder particles may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The magnetic metal powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The magnetic metal powder particle may be amorphous or crystalline. For example, the magnetic metal powder particle may be a Fe—Si—B—Cr-based amorphous alloy powder, but is not limited thereto.

Each of the magnetic metal powder particles 10 may have an average diameter of about 0.1 μm to 30 μm, but is not limited thereto.

The body 100 may include two or more types of magnetic metal powder particle dispersed in a resin. The term "different types of magnetic powder particle" means that the magnetic powder particles, dispersed in the resin, are distinguished from each other by at least one of average diameter, composition, crystallinity, and shape.

The resin may include epoxy, polyimide, liquid crystal polymer, or the like, in a single or combined form, but is not limited thereto.

The body 100 may include a core 110 penetrating through a central portion of the coil portion 300 to be described later. The core 110 may be formed by filling the central portion of the coil portion 300 with a magnetic composite sheet, but the present disclosure is not limited thereto.

The coil portion 300 is disposed inside the body 100 to express characteristics of the coil component 1000. For example, when the coil component 1000 is used as a power inductor, the coil portion 300 may store an electric field as a magnetic field to maintain an output voltage, serving to stabilize power of an electronic device.

The coil portion 300 may have a shape of a planar spiral in which at least one turn is formed around the core 110. The coil portion 300 may have an internal end portion 300A, disposed adjacent to the core 110, and an external end portion 300B. The internal end portion 300A is an end portion of an innermost turn, and the external end portion 300B is an end portion of an outermost turn. The internal end portion of the coil portion 300 may be connected to the lead portion 400 by a via V penetrating through the support substrate 200 to be described later. The external end portion 300B of the coil portion 300 may be exposed to the first surface 101 of the body 100. The lead portion 400 to be described later may be exposed to the second surface 102 of the body 100. The first and second external electrodes 600 and 700 to be described later may be disposed on the first and second surfaces 101 and 102 of the body 100 to be connected to the external end portion 300B of the coil portion 300 and an end portion of the lead portion 400, respectively. Thus, the coil portion 300 may function as a single coil, connected to the first and second external electrodes 600 and 700, overall.

The lead portion 400 may be disposed in the body 100 to be spaced apart from the coil portion 300. Specifically, in the case of the present embodiment, the lead portion 400 may be disposed above an upper surface of the coil portion 300 to be spaced apart from the coil portion 300, based on the direction of FIG. 2. The lead portion 400 may have one end portion, connected to the internal end portion 300A of the coil portion 300 by the via V to be described later, and the other end portion exposed to the second surface 102 of the body 100 to be connected to the second external electrode 700. The lead portion 400 may be formed to overlap a certain region of the upper surface of the coil portion 300, based on the direction of FIG. 2. The lead portion 400 may be formed to have a shape of a bar overlapping each of a plurality of turns of the coil portion 300.

A thickness of the lead portion 400 may be less than a thickness of the coil portion 300. As described above, the lead portion 400 may be configured to lead the internal end portion 300A of the coil portion 300 out to the second external electrode 700 and may not be configured to form a turn of a coil. Therefore, the lead portion 400 may be formed to have a thickness less than the thickness of the coil portion 300, which may be advantageous for thinning of the coil component 1000 according to an exemplary embodiment.

The support substrate 200 may be disposed between the coil portion 300 and the lead portion 400 to correspond to the lead portion 400. The support substrate 200 may be configured to support the coil portion 300 during a process. In the present embodiment, the coil portion 300 may be formed during a manufacturing process, and then the support substrate 200 may be processed to have a shape corresponding to a shape of the lead portion 400. For example, in the case of a typical thin-film type coil component, a support substrate may have a shape corresponding to a shape of a coil portion in an end product. Meanwhile, in the coil component 1000 according to the present embodiment, the support substrate 200 may be disposed in only one region of the upper surface of the coil portion 300, in which the lead portion 400 is disposed, to correspond to the shape of the lead portion 400, based on the direction of FIG. 2. As a result, the coil portion 300 according to the present disclosure may be in direct contact with the insulating layer 500 to be described later because the support substrate 200 is not disposed on a region, in which the coil portion 300 does not overlap the lead portion 400, of the upper surface of the coil portion 300, based on the directions of FIGS. 1 and 2. Since the support substrate 200 is only disposed in an overlapping region between the upper surface of the lead portion 400 and the coil portion 300, the coil component 1000 according to the present disclosure may be thinned while maintaining electrical insulation of the lead portion 400 and the coil portion 300.

The support substrate 200 may include an insulating material, for example, a thermosetting insulating resin such as an epoxy resin, a thermoplastic insulating resin such as polyimide, or a photosensitive insulating resin, or the support substrate 200 may include an insulating material in which a reinforcing material such as a glass fiber or an inorganic filler is impregnated with an insulating resin. For example, the support substrate 200 may include an insulating material such as prepreg, Ajinomoto Build-up Film (ABF), FR-4, a bismaleimide triazine (BT) film, a photoimageable dielectric (PID) film, and the like, but are not limited thereto. In the case of the present embodiment, since the support substrate 200 is formed of an insulating material including a reinforcing material such as woven glass cloth, the coil portion 300 may be more stably supported during a manufacturing process.

The inorganic filler may be at least one or more selected from the group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

The via V may penetrate through the support substrate 200 to connect the internal end portion 300A of the coil portion 300 and an internal end portion of the lead portion 400 to each other. In the case of a typical thin-film type coil component, a coil portion includes a coil-shaped pattern formed on each of both surfaces of a support substrate. Meanwhile, in the present embodiment, the coil portion 300 is formed on only a side of a lower surface of the support substrate 200, based on the direction of FIG. 2. In this case, the via V and the lead portion 400 may be used as configurations to connect the internal end portion 300A of the coil portion 300 and the second external electrode 700 to each other.

Each of the coil portion 300, the via V, and the lead portion 400 may be formed of a conductive material such as copper (Cu), aluminum (Al), silver (Ag), tin (Sn), gold (Au), nickel (Ni), lead (Pb), titanium (Ti), molybdenum (Mo), chromium (Cr), or alloys thereof, but the conductive material is not limited thereto.

The insulating layer 500 may be disposed between the coil portion 300 and the body 100, between the support substrate 200 and the body 100, and between the lead portion 400 and the body 100. The insulating layer 500 may be formed along the surfaces of the support substrate 200, the coil portion 300, and the lead portion 400, but the present disclosure is not limited thereto. The insulating layer 500 may cover and be in contact with the entire surface of the coil portion 300, other than a region, overlapping the lead portion 400, of the upper surface of the coil portion 300, based on the direction of FIG. 2.

The insulating layer 500 may be provided to insulate each of the coil portion 300 and the lead portion 400 from the body 100, and may include a known insulating material such as parylene but the present disclosure is not limited thereto. As another example, the insulating layer 500 may include an insulating material such as an epoxy resin or the like, other than parylene. The insulating layer 500 may be formed by a vapor deposition method, but the present disclosure is not limited thereto. As another example, the insulating layer 500 may be formed by laminating an insulating film for forming the insulating layer 500 on both surfaces of the support substrate 200, on which the coil portion 300 is formed, and curing the laminated insulating film. Alternatively, the insulating layer 500 may be formed by applying an insulating paste for forming the insulating layer 500 to both surfaces of the support substrate 200, on which the coil portion 300 is formed, and curing the applied insulating paste.

The coil portion 300 may have one surface, opposing the lead portion 400, and the other surface opposing the one surface of the coil portion 300. One region, in contact with the support substrate 200, of the one surface of the coil portion 300 may have lower surface roughness than the other region except for the one region of the coil portion 300.

Referring to FIGS. 2 and 3, the insulating layer 400 may be in contact with all surfaces of the coil portion 300 except for a region, overlapping the lead portion 400, of the upper surface of the coil portion 300, based on the directions of FIGS. 2 and 3. Since the insulating layer 400 is formed to have a relatively low thickness, bonding strength between the coil portion 300 and the insulating layer 400 may be poor. In the case of the present embodiment, based on the directions of FIGS. 2 and 3, a region, not in contact with the support substrate 200, of the upper surface of the coil portion 300 may be formed to have higher surface roughness than a region, in contact with the support substrate 200, of the upper surface of the coil portion 300, and thus, bonding strength between the coil portion 300 and the insulating layer 400 may be improved. The surface roughness of the region, not in contact with the support substrate 200, of the upper surface of the coil portion 300 may be formed during a process of controlling the support substrate 200 after forming a plating layer 320 to be described later, but the scope of the present embodiment is not limited thereto.

The coil portion 300 may include a seed layer 310 and a plating layer 320 disposed on the seed layer 310. The coil portion 300 may include a seed layer 310, disposed on an upper side based on the directions of FIGS. 2 and 3, and a plating layer 320 disposed on a lower surface of the seed layer 310. The seed layer 310 may be formed by vapor deposition such as electroless plating or sputtering, and may include at least one of copper (Cu), aluminum (Al), silver (Ag), tin (Sn), gold (Au), nickel (Ni), lead (Pb), titanium (Ti), chromium (Cr), or alloys thereof. The seed layer 310 may include at least one layer. The plating layer 320 may be formed by performing electroplating using the seed layer 310 as a seed, and may include at least one of copper (Cu), aluminum (Al), silver (Ag), tin (Sn), gold (Au), It contains at least one of nickel (Ni), lead (Pb), titanium (Ti) , chromium (Cr) , or alloys thereof. The plating layer 300 may include at least one layer.

The plating layer 320 may expose a side surface of the seed layer 310, and the insulating layer 500 may be in contact the side surface of the seed layer 310. In the case of the present embodiment, the coil portion 300 may be formed by forming a seed layer 310 on entire one surface of the support substrate 200, forming a plating resist, having an opening corresponding to a shape of the coil portion 300, on the one surface of the support substrate 200 on which the seed layer 310 is formed, filling the opening of the plating resist with a conductive material to form a plating layer 320, removing the plating resist, and removing a region, in which the plating layer 320 is not formed, of the seed layer. Accordingly, the plating layer 320 may be formed on the seed layer 310 to expose the side surface of the seed layer 310, and the insulating layer 500 formed through a subsequent process may be formed to be in contact with a side surface of the plating layer 320 and the side surface of the seed layer 310. In the example of the above-described manufacturing method, a region of the support substrate 200, except for a region in which the coil portion 300 and the lead portion 400 overlap each other, may be removed together with the plating resist or the seed layer 310 during a process of removing the plating resist or a process of removing the seed layer 310. However, the scope of the present embodiment is not limited thereto.

The external electrodes 600 and 700 may be disposed to be spaced apart from each other on one surface 106 of the body 100, and may be connected to external end portions of the coil portion 300 and the lead portion 400, respectively. Specifically, the first external electrode 600 may be disposed on the sixth surface 106 of the body 100 and may extend to the first surface 101 of the body 100 to be in contact with, and connected to, the external end portion 300b of the coil portion 300 exposed to the first surface 101 of the body 100. The second external electrode 700 may be disposed to be spaced apart from the first external electrode 600 on the sixth surface 106 of the body 100, and may extend to the second surface 102 of the body 100 to be in contact with, and connected to, the external end portion of the lead portion 400 exposed to the second surface 102 of the body 100. In FIGS. 1 and 2, each of the external electrodes 600 and 700 is illustrated as having an L shape. However, this is only an example, and the scope of the present embodiment is not limited thereto. As an example, each of the first and second external electrodes 600 and 700 may be disposed on only the sixth surface 106 of the body 100 to be connected to the external end portion 300B of the coil portion 300 and the eternal end portion of the lead portion 400 by a connection electrode, penetrating through the body 100, or the like. As another example, the first external electrode 600 may cover the first surface 101 of the body 100 to be in contact with, and connected to, the external end portion 300B of the coil portion 300, and may be formed to extend to at least a portion of each of the third to sixth surfaces 103, 104, 105, and 106 of the body 100.

The external electrodes 600 and 700 may be formed by a vapor deposition method such as sputtering and/or a plating method, but the present disclosure is not limited thereto. The external electrodes 600 and 700 may be formed by applying a conductive resin, including conductive powder particles such as copper (Cu), on a surface of the body 100 and curing the applied conductive resin.

The external electrodes 600 and 700 may be formed of copper (Cu), aluminum (Al), silver (Ag), tin (Sn), gold (Au), nickel (Ni), lead (Pb), chromium (Cr), titanium (Ti), or an alloy thereof, but the present disclosure is not limited thereto. The external electrodes 600 and 700 may be formed to have a single-layer structure or a multilayer structure. As an example, the external electrodes 600 and 700 may include a first electrode layer including copper (Cu), a second electrode layer including nickel (Ni), and a third electrode layer including tin (Sn), but the present disclosure is not limited thereto.

Although not illustrated, the coil component 1000 according to the present embodiment may further include an insulating layer covering a region, in which the external electrodes 600 and 700 are not formed, of the first to sixth surfaces 101, 102, 103, 104, 105, and 106 of the body 100. The insulating layer may be used as a photoresist and may prevent plating dispersal, or the like, when the external electrodes 600 and 700 are formed by electroplating. In addition, the insulating layer may extend upwardly of the external electrodes 600 and 700 to cover a region of the external electrodes 600 and 700, other than a region disposed on the sixth surface 106 of the body 100, so as to prevent short-circuits between different components disposed on a mounting board, or the like, to be adjacent to the coil component 100.

Second Embodiment

Figure 4:
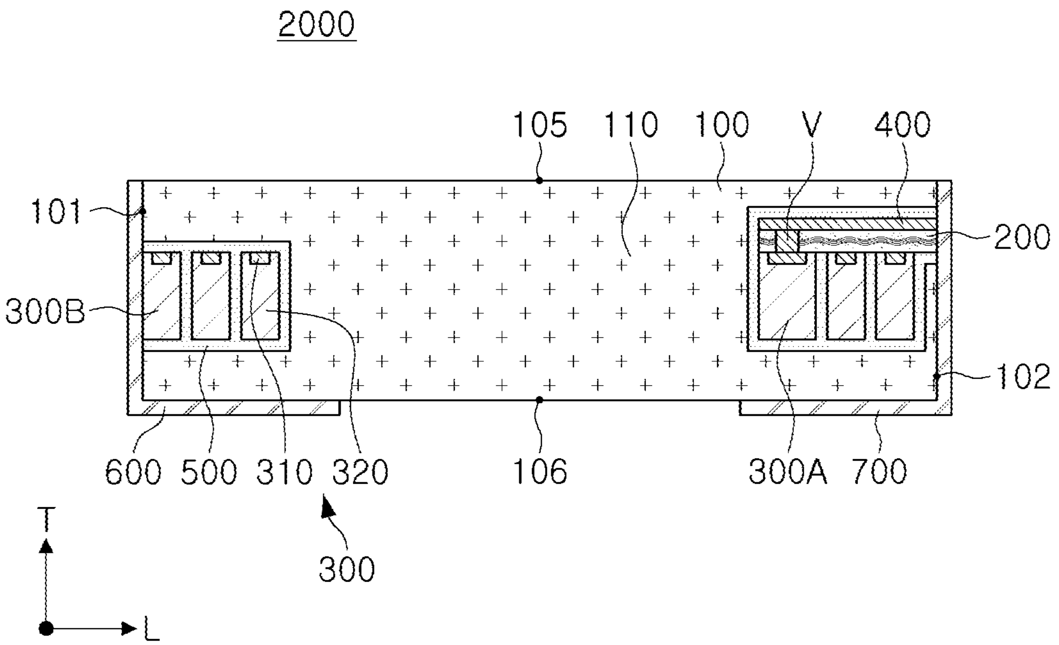
FIG. 4 is a cross-sectional view, taken along line I-I' of FIG. 1, schematically illustrating a coil component according to a second embodiment of the present disclosure.

FIG. 4 is a cross-sectional view, taken along line I-I' of FIG. 1, schematically illustrating a coil component according to a second embodiment of the present disclosure.

Referring to FIGS. 1 to 3 and FIG. 4, a difference of the coil component 2000 according to the present embodiment from the coil component 1000 according to the first embodiment lies in a structure of a coil portion 300. Therefore, a description of the present embodiment will focus on only the structure of the coil portion 300. The description of the first embodiment will be applied to the description of the other configurations of the present embodiment as it is.

Referring to FIG. 4, a coil portion 300 applied to the present embodiment may include a seed layer 310 and a plating layer 320 disposed on the seed layer 310, and the plating layer 320 may cover at least a portion of a side surface of the seed layer 310.

In the case of the present embodiment, in a coil portion 300, a planar spiral-shaped seed layer 310 may be formed on one surface of a support substrate 200 and a plating resist, having an opening corresponding to a shape of the coil portion 300 may be formed on the one surface of the support substrate 200. Then, the opening of the plating resist may be filled with a conductive material to form a plating layer 320, and the plating resist may be removed. The opening of the plating resist may be formed to have a line width greater than a line width of the seed layer 310 in such a manner that the planar spiral-shaped seed layer 310 is exposed. Accordingly, the plating layer 320 may be formed on the seed layer 310 to cover the entire side surface of the seed layer 310. The insulating layer 500 may be formed through a subsequent process to be in contact with only an upper surface of the seed layer 310, rather than a side surface of the seed layer, based on the direction of FIG. 4.

In an example of the above-described manufacturing method, a region of the support substrate 200, except for an overlapping region between the coil portion 300 and the lead portion 400, may be removed together with the plating resist, but the scope of the present embodiment is not limited thereto.

Unlike in the first embodiment, in the present embodiment, the plating layer 320 may be formed after forming the planar spiral-shaped seed layer 310. In the present embodiment, since a process of removing the seed layer 310 is not required, loss of a conductor of the plating layer 320 may be prevented from occurring during the process of removing the seed layer 310.

Third and Fourth Embodiments

Figure 5:
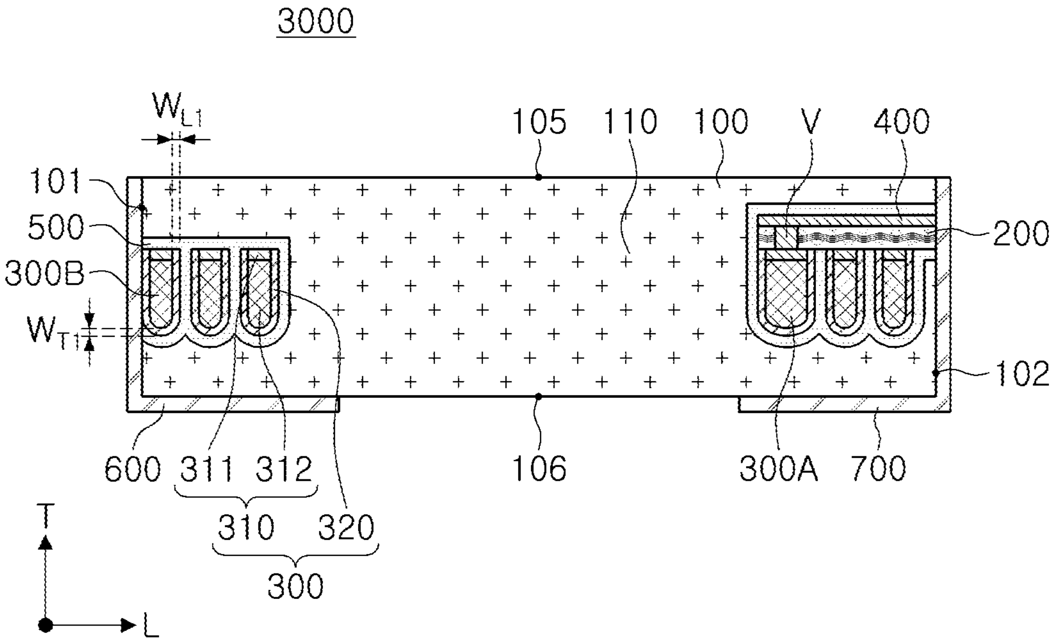
FIG. 5 is a cross-sectional view, taken along line I-I' of FIG. 1, schematically illustrating a coil component according to a third embodiment of the present disclosure.
Figure 6:
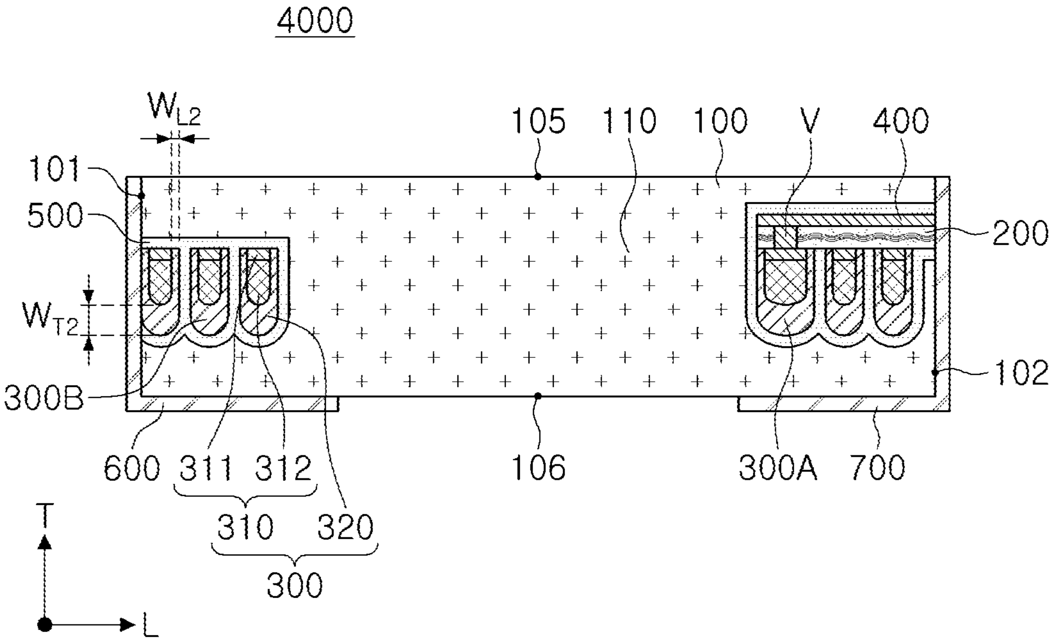
FIG. 6 is a cross-sectional view, taken along line I-I' of FIG. 1, schematically illustrating a coil component according to a fourth embodiment of the present disclosure.

FIG. 5 is a cross-sectional view, taken along line I-I' of FIG. 1, schematically illustrating a coil component according to a third embodiment of the present disclosure. FIG. 6 is a cross-sectional view, taken along line I-I' of FIG. 1, schematically illustrating a coil component according to a fourth embodiment of the present disclosure.

Referring to FIGS. 1 to 3 and FIGS. 5 and 6, a difference of each of coil components 3000 and 4000 according to the third and fourth embodiments from the coil component 1000 according to the first embodiment lies in a structure of a coil portion 300. Therefore, descriptions of theses embodiments will focus on only the structure of the coil portion 300. The description of the first embodiment will be applied to the description of the other configurations of the third and fourth embodiment as it is.

Referring to FIGS. 5 and 6, in a coil portion 300 applied to each of the coil components 3000 and 4000 according to the third and fourth embodiments, a seed layer 310 may include a first seed pattern layer 311 and a second seed pattern layer 312 disposed on the first seed pattern layer 311 to expose a side surface of the first seed pattern layer 311, and a plating layer 320 may be in contact with a side surface of each of the first and second seed pattern layers 311 and 312.

In the coil portion 300, the seed layer 310 may be formed on one surface of the support substrate 200 to have a multilayer structure, and the plating layer 320 may be formed by plating in the state in which a plating resist is not formed on the seed layer 310. The seed layer 310 may be formed to have a multilayer structure to have a relatively high aspect ratio (A/R), as compared with that in the first embodiment. As a result, the plating layer 320 may be formed without using a plating resist.

Referring to FIGS. 5 and 6, based on the directions of FIGS. 5 and 6, the plating layer 320 may be plated and grown on all surfaces of the seed layer 310, other than an upper surface of the seed layer 310.

Referring to FIG. 5, in a cross-section of the body 100 in a thickness direction T, the plating layer 320 grown from a lower surface of the seed layer 310 in the thickness direction T of the body 100 may have a length WT1 equal to a thickness WL1 of the plating layer 320 grown from a side surface of the seed layer 310 in a direction (a length direction L), perpendicular to the thickness direction T of the body 100. For example, the plating layer 320 may be an isotropically grown plating layer.

Referring to FIG. 6, in a cross section of the body 100 in a thickness direction, the plating layer 320 grown from a lower surface of the seed layer 310 in the thickness direction T of the body 100 may have a length WT2 greater than a length WL2 of the plating layer 320 grown from a side surface of the seed layer 310 in a direction (a length direction L), perpendicular to the thickness direction T of the body 100. For example, the plating layer 320 may be an anisotropically grown plating layer.

A plating resist having relatively high sensitivity to light during exposure is used to form a coil portion having a high aspect ratio through a plating process using a plating resist, which cause an increase in manufacturing costs. In the exemplary embodiments of the present disclosure, when the coil portion 300 is formed by plating, a coil portion having a high aspect ratio may be formed without using a plating resist.

As described above, according to an exemplary embodiment, a thickness of a coil component may be reduced.

In addition, according to an exemplary embodiment, a ratio of a magnetic material in a body having the same size may be increased.

While exemplary embodiments have been shown and described above, it will be apparent to those skilled in the art that modifications and variations could be made without departing from the scope of the present disclosure as defined by the appended claims.

What is claimed is:

1. A coil component, comprising:

a body;

a planar spiral-shaped coil portion disposed in the body, the coil portion having a core penetrating through a center thereof;

a conducting lead portion disposed to be spaced apart from the coil portion in the body without overlapping the core;

an insulating support substrate disposed between the coil portion and the lead portion, and overlapping the coil portion only in a region where the coil portion and the lead portion overlap;

a via penetrating through the support substrate to connect an internal end portion of the coil portion and an internal end portion of the lead portion to each other;

an insulating layer covering the coil portion and the lead portion; and a first external electrode disposed on a side surface of the body and connected to an external side surface of the lead portion.

2. The coil component of claim 1, wherein the lead portion has a thickness less than a thickness of the coil portion.

3. The coil component of claim 1, wherein the coil portion comprises a seed layer and a plating layer disposed on the seed layer.

4. The coil component of claim 3, wherein the plating layer does not cover a side surface of the seed layer, and the insulating layer is in contact with the side surface of the seed layer.

5. The coil component of claim 3, wherein the plating layer covers at least a portion of a side surface of the seed layer.

6. The coil component of claim 5, wherein the side surface of the seed layer is not in contact with the insulating layer.

7. The coil component of claim 3, wherein the seed layer comprises a first seed pattern layer and a second seed pattern layer disposed on the first seed pattern layer to expose a side surface of the first seed pattern layer, and the plating layer is in contact with a side surface of each of the first and second seed pattern layers.

8. The coil component of claim 7, wherein the plating layer is an isotropic plating layer.

9. The coil component of claim 7, wherein in a cross section of the body in a thickness direction, the plating layer grown from an upper surface of the seed layer in a thickness direction of the body has a thickness greater than a thickness of the plating layer grown from a side surface of the seed layer in a direction, perpendicular to the thickness of the body.

10. The coil component of claim 1, wherein the support substrate includes a glass fiber.

11. A coil component comprising:

a body;

a planar spiral-shaped coil portion disposed in the body having a core penetrating through a center of the coil portion;

a lead portion disposed on a first surface of the coil portion in the body without overlapping the core;

a support substrate disposed to overlap the coil portion in only an overlapping region between the lead portion and the first surface of the coil portion; and a via penetrating through the support substrate to connect the coil portion and the lead portion to each other, wherein an outer perimeter of the lead portion is congruent with an outer perimeter of the support substrate when viewed in an axis direction of the coil portion.

12. A coil component, comprising:

a coil having a first end and a second end, the coil being disposed in a body such that the first end is exposed from a first surface of the body and the second end is spaced apart from a second surface of the body by a distance of at least a width of one turn of the coil, the second surface opposing the first surface in a length direction;

a core penetrating a central portion of the coil;

a conducting lead portion having a first end disposed on the second end of the coil and a second end exposed from the second surface of the body, the lead portion extending over the distance;

an insulating support substrate disposed between the lead portion and overlapping the coil portion, the insulating substrate overlapping the coil portion only in a region where the coil portion and the lead portion overlap; and a conducting via penetrating the support substrate and connecting the first end of the lead portion and the second end of the coil to each other, wherein an outer perimeter of the lead portion is congruent with an outer perimeter of the support substrate when viewed in an axis direction of the coil portion.

13. The coil component of claim 12, further comprising:

a first external electrode disposed on the first surface of the body and contacting the first end of the coil; and a second external electrode disposed on the second surface of the body and contacting the second end of the lead portion.

14. The coil component of claim 12, wherein a thickness of the coil is greater than a thickness of the lead portion.

15. The coil component of claim 12, further comprising an insulating layer covering the lead portion and a portion of the coil not in contact with the support substrate.

16. The coil component of claim 12, wherein the coil comprises a seed layer and a plating layer disposed on the seed layer, the plating layer having a thickness greater than the seed layer.

17. The coil component of claim 16, wherein a portion of the seed layer is disposed on the support substrate.

18. The coil component of claim 16, wherein the plating layer covers at least a portion of a side surface of the seed layer.

19. The coil component of claim 12, wherein the support substrate has a same shape as that of the lead portion.

* * * * *